United States Patent
Aoki et al.

(10) Patent No.: US 9,353,677 B2
(45) Date of Patent: May 31, 2016

(54) CONTROL METHODS AND CONTROL APPARATUSES OF INTERNAL-COMBUSTION ENGINES

(71) Applicant: KABUSHIKI KAISHA TOYOTA JIDOSHOKKI, Kariya-shi, Aichi-ken (JP)

(72) Inventors: Hideki Aoki, Kariya (JP); Haruki Masuyama, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 223 days.

(21) Appl. No.: 13/973,737

(22) Filed: Aug. 22, 2013

(65) Prior Publication Data

US 2014/0060042 A1 Mar. 6, 2014

(30) Foreign Application Priority Data

Aug. 28, 2012 (JP) ................. 2012-187514

(51) Int. Cl.
 *F02D 23/00* (2006.01)
 *F02B 37/22* (2006.01)
 *F02D 41/00* (2006.01)
 (Continued)

(52) U.S. Cl.
 CPC ............ *F02B 37/22* (2013.01); *F02D 41/0007* (2013.01); *F02D 41/145* (2013.01); *F02D 41/1446* (2013.01); *F02D 41/1448* (2013.01); *F02B 37/24* (2013.01); *F02D 41/1445* (2013.01); *F02D 41/1447* (2013.01); (Continued)

(58) Field of Classification Search
 CPC . F02B 37/22; F02D 41/0007; F02D 41/1448; F02D 41/1446; F02D 41/145

USPC .................................................. 60/602, 605.1
See application file for complete search history.

(56) References Cited

U.S. PATENT DOCUMENTS 4,763,476 A * 8/1988 Hirabayashi ..................... 60/602
5,440,879 A * 8/1995 Dellora ........................... 60/602
(Continued)

FOREIGN PATENT DOCUMENTS

CN 1297510 A 5/2001
CN 1376853 A 10/2002
(Continued)

OTHER PUBLICATIONS

Communication dated Feb. 10, 2015, issued by the European Patent Office in counterpart Application No. 13180031.0.
(Continued)

*Primary Examiner* — Kenneth Bomberg
*Assistant Examiner* — Jason T Newton
(74) *Attorney, Agent, or Firm* — Sughrue Mion, PLLC (57) ABSTRACT

A control apparatus calculates an upstream side pressure and temperature on an upstream side of a turbine impeller and a turbine flow rate, and calculates an upper limit threshold value of an opening degree level of a variable nozzle of a turbo supercharger such that a turbine pressure ratio is equal to or less than a predetermined ratio on a basis of the turbine flow rate and a pressure ratio•turbine flow rate characteristic. The pressure ratio•turbine flow rate characteristic is pre-stored information indicating a relationship between the turbine pressure ratio, the turbine flow rate, and the opening degree level of the variable nozzle. The control apparatus controls an opening degree of the variable nozzle so as to be an opening degree equal to or less than the upper limit threshold value.

2 Claims, 7 Drawing Sheets

(51) Int. Cl.
*F02D 41/14* (2006.01)
*F02D 41/18* (2006.01)
*F02B 37/24* (2006.01)

(52) U.S. Cl.
CPC .......... *F02D 41/18* (2013.01); *F02D 2200/703* (2013.01); *Y02T 10/144* (2013.01)

(56) References Cited

U.S. PATENT DOCUMENTS

| | | | |
|---|---|---|---|
| 6,418,719 B2 * | 7/2002 | Terry et al. | 60/602 |
| 2003/0121263 A1 * | 7/2003 | Hidaka | 60/602 |
| 2008/0051973 A1 * | 2/2008 | Gangopadhyay et al. | 701/102 |
| 2010/0131159 A1 | 5/2010 | Swartling et al. | |
| 2012/0023932 A1 * | 2/2012 | Ge et al. | 60/602 |

FOREIGN PATENT DOCUMENTS

| | | |
|---|---|---|
| CN | 102345528 A | 2/2012 |
| EP | 1323907 A1 | 7/2003 |
| EP | 1672203 A2 | 6/2006 |
| JP | 2000-356162 A | 12/2000 |
| JP | 2006-200377 A | 8/2006 |
| JP | 2007-85227 A | 4/2007 |
| JP | 2009-174363 A | 8/2009 |
| JP | 2009-174396 A | 8/2009 |
| JP | 2010-031829 A | 2/2010 |
| JP | 2010-216305 A | 9/2010 |
| WO | 2008024590 A2 | 2/2008 |

OTHER PUBLICATIONS

Dinescu et al Mean Value Modeling of a Variable Nozzle Turbocharger (VNT), "UPB Scientific Bulletin, Series D", Jan. 1, 2010, XP055164332, ISSN: 1454-2358 vol. 72, pp. 109-116.

Jankovic et al Robust nonlinear controller for turbocharged diesel engines, Proceedings of the 1998 American Control Conference ACC (IEEE Cat. No. 98CH36207), Jun. 21, 1998-Jun. 26, 1998, pp. 1389-1394.

Communication dated Jun. 23, 2015 from the State Intellectual Property Office of the P.R.C. in counterpart application No. 201310378877.X.

Communication dated Jul. 7, 2015 from the Japanese Patent Office in counterpart application No. 2012-187514.

Communication dated Mar. 22, 2016, from the European Patent Office in counterpart European Application No. 13180031.0.

* cited by examiner

CONTROL METHOD IN RELATED ART

FIG. 5A

CONTROL METHOD IN RELATED ART

CONTROL METHODS AND CONTROL APPARATUSES OF INTERNAL-COMBUSTION ENGINES

This application claims priority to Japanese patent application serial number 2012-187514, the contents of which are incorporated herein by reference.

BACKGROUND OF THE INVENTION

1. Field of the Invention

Embodiments of the present invention relate to control methods and control apparatuses of internal-combustion engines. Internal-combustion engines typically have a turbo supercharger. A turbo supercharger has variable nozzles capable of adjusting the flow velocity of gas exhausted to a turbine impeller.

2. Description of the Related Art

In recent years, internal-combustion engines have been widespread. The engines have a turbo supercharger including variable nozzles. Adjusting an opening degree of the variable nozzles may obtain an appropriate supercharging pressure even if the number of revolutions of the internal-combustion engine is low. Thereby, output power of the internal-combustion engine may be increased.

When the internal-combustion engine is operated in very high load and high revolution states, a big pressure difference occurs before and after a turbine impeller. A stress occurs before and after the turbine impeller due to the pressure difference as well as exhaust pulsation. Exhaust pulsation may occur due to each explosion stroke of the internal-combustion engine. If the turbine impeller is continuously exposed to a stress which is equal to or greater than a predetermined stress for a long time, the life thereof may be shortened. A method for preventing the above problem is known. In the method, the engine is controlled so that a before-after pressure ratio of the turbine impeller is equal to or less than a predetermined pressure ratio. The before-after pressure ratio is pressure before turbine/pressure after turbine.

A control apparatus of an internal-combustion engine disclosed in Japanese Laid-Open Patent Publication No. 2010-31829 includes a target upstream side exhaust pressure calculator and a vane opening degree controller in order to improve feedback control of a supercharging pressure. The target upstream side exhaust pressure calculator calculates a target upstream side exhaust pressure such that actual supercharging pressure matches a target supercharging pressure. The vane opening degree controller calculates a target before-after exhaust pressure ratio such that actual upstream side exhaust pressure matches the target upstream side exhaust pressure. The vane opening degree controller determines a vane opening degree (variable nozzle opening degree) corresponding to the target before-after exhaust pressure ratio on the basis of a predetermined turbine model.

The internal-combustion engine includes an Exhaust Gas Recirculation (EGR) in order to reduce NOx in exhaust gas. Pressure sensors are respectively provided on the upstream side and the downstream side of the turbine. The target before-after exhaust pressure ratio is obtained using the actual upstream side exhaust pressure which is a pressure on the upstream side of the turbine. When the EGR is turned from an OFF state to an ON state, an opening degree of the variable nozzles instantaneously varies. However, the EGR amount and the actual upstream side exhaust pressure vary slightly shortly after. Due to this response delay, there is a probability that an exhaust pressure ratio before and after the turbine may exceed an allowable value only for a short time. For this reason, the turbine impeller cannot be sufficiently protected in some situations.

A before-after exhaust pressure ratio (actual upstream side exhaust pressure/actual downstream side exhaust pressure) is practically obtained, and control according to a difference with the target before-after exhaust pressure ratio is performed. For this reason, the actual downstream side exhaust pressure is necessary for the control. Thus, a pressure sensor is necessary on the turbine downstream side. A temperature sensor is also necessary on the turbine upstream side.

Therefore, there is need in the art for a control method and a control apparatus of an internal-combustion engine, capable of appropriately controlling a before-after pressure ratio of a turbine impeller to a desired pressure ratio with good responsiveness. There is also the need in reducing the number of detection means (sensors).

SUMMARY OF THE INVENTION

According to one aspect of the invention, an internal-combustion engine has a turbo supercharger with a variable nozzle capable of adjusting the flow velocity of gas exhausted to a turbine impeller. A control apparatus controls the engine as in the following steps. The control apparatus calculates a fuel flow rate based on an injection quantity of fuel into the internal-combustion engine and a number of revolutions of the internal-combustion engine. The control apparatus calculates or detects an upstream side pressure on an upstream side of the turbine impeller. The control apparatus calculates or detects an upstream side temperature on the upstream side of the turbine impeller. The control apparatus calculates or detects a turbine flow rate of gas flowing toward the turbine impeller. The control apparatus calculates an upper limit threshold value of an opening degree level of the variable nozzle such that a turbine pressure ratio is equal to or less than a predetermined ratio on a basis of the turbine flow rate and a pressure ratio•turbine flow rate characteristic. The turbine pressure ratio is a ratio of the pressure on the upstream side to the pressure on the downstream side of the turbine impeller. The pressure ratio•turbine flow rate characteristic is pre-stored information indicating a relationship between the turbine pressure ratio, the turbine flow rate, and the opening degree level of the variable nozzle. The control apparatus controls an opening degree of the variable nozzle so as to be an opening degree equal to or less than the upper limit threshold value.

According to the control method, the internal-combustion engine can be controlled in a desired turbine pressure ratio with better responsiveness.

According to another aspect of the invention, the control apparatus may calculate the upstream side pressure based on an intake air flow rate, the fuel flow rate, and an atmospheric pressure. The intake air flow is taken into the internal-combustion engine. The control apparatus may calculate an upstream side temperature based on the injection quantity, the intake air flow rate, and the fuel flow rate. The control apparatus may calculate the turbine flow rate based on the fuel flow rate, the intake air flow rate, the upstream side pressure, and the upstream side temperature.

Therefore, the upstream side pressure is not detected by a pressure sensor but instead is calculated using the intake air flow rate, the fuel flow rate, and the atmospheric pressure. The intake air flow rate instantaneously varies, for example, when an EGR is turned from an OFF state to an ON state. For this reason, the intake air flow rate varies with very good responsiveness with respect to a variation in an exhaust pressure on the upstream side of the turbine impeller. The internal-combustion engine is not required to have pressure sensors on the upstream side and the downstream side of the turbine impeller. The internal-combustion engine is also not required to have a temperature sensor on the upstream side of the turbine impeller. Therefore, it is possible to further reduce the number of sensors of the internal-combustion engine.

According to another aspect of the invention, the control apparatus may obtain the upstream side pressure based on a detection signal from a pressure sensor capable of detecting a pressure on the upstream side of the turbine impeller. Thus, the exhaust pressure on the upstream side of the turbine impeller is not calculated but is obtained based on the detection signal from the pressure sensor. Thereby, the exhaust pressure can be obtained with higher accuracy.

According to another aspect of the invention, the control apparatus may obtain the upstream side temperature based on a detection signal from a temperature sensor capable of detecting a temperature on the upstream side of the turbine impeller. Thus, an exhaust temperature on the upstream side of the turbine impeller is not calculated but is obtained based on the detection signal from the temperature sensor. Thereby, the exhaust temperature can be obtained with higher accuracy.

According to one aspect of the invention, a control apparatus of an internal-combustion engine includes a turbo supercharger, an opening degree adjustment device, a memory, and a controller. The turbo supercharger has a variable nozzle capable of adjusting a flow velocity of gas exhausted to a turbine impeller. The opening degree adjustment device adjusts an opening degree of the variable nozzle. The memory stores a pressure ratio•turbine flow rate characteristic indicating a relationship between a turbine pressure ratio, a turbine flow rate, and an opening degree level of the variable nozzle. The turbine pressure ratio is a ratio of the pressure on an upstream side of the turbine impeller to the pressure on a downstream side of the turbine impeller.

The controller detects an injection quantity of fuel in the internal-combustion engine based on the injection command signal sent to an injector for injecting fuel into the internal-combustion engine. The controller detects an intake air flow rate received in the internal-combustion engine based on a detection signal from an air flow rate detecting sensor. The controller detects a number of revolutions of the internal-combustion engine based on the detection signal from an internal-combustion engine revolution number detection device. The controller detects an atmospheric pressure based on the detection signal from an atmospheric pressure sensor. The controller calculates a fuel flow rate based on the injection quantity and the internal-combustion engine revolution number. The controller calculates or detects an upstream side pressure on the upstream side of the turbine impeller. The controller calculates or detects an upstream side temperature on the upstream side of the turbine impeller. The controller calculates the turbine flow rate. The controller calculates an upper limit threshold value of the opening degree level of the variable nozzle such that the turbine pressure ratio is equal to or less than a predetermined value based on the turbine flow rate and the pressure ratio•turbine flow rate characteristic. The controller adjusts the opening degree of the variable nozzle so as to be an opening degree equal to or less than the upper limit threshold value by using the opening degree adjustment device.

According to another aspect of the invention, the controller may calculate the upstream side pressure based on the intake air flow rate, the fuel flow rate, and atmospheric pressure. The controller may calculate an upstream side temperature based on the injection quantity, the intake air flow rate, and the fuel flow rate. The controller may calculate the turbine flow rate based on the fuel flow rate, the intake air flow rate, the upstream side pressure, and the upstream side temperature.

Therefore, the upstream side pressure is not detected by pressure sensor but is calculated using the intake air flow rate, the fuel flow rate, and the atmospheric pressure. The intake air flow rate instantaneously varies, for example, when an EGR is turned from an OFF state to an ON state. For this reason, the intake air flow rate varies with very good responsiveness with respect to a variation in an exhaust pressure on the upstream side of the turbine impeller. The internal-combustion engine is not required to have pressure sensors on the upstream side and the downstream side of the turbine impeller. The internal-combustion engine is also not required to have a temperature sensor on the upstream side of the turbine impeller. Therefore, it is possible to further reduce the number of sensors of the internal-combustion engine.

According to another aspect of the invention, the controller may obtain the upstream side pressure based on a detection signal from a pressure sensor capable of detecting a pressure on the upstream side of the turbine impeller. Thus, the exhaust pressure on the upstream side of the turbine impeller is not calculated but is obtained based on the detection signal from the pressure sensor. Thereby, the exhaust pressure can be obtained with higher accuracy.

According to another aspect of the invention, the controller may obtain the upstream side temperature based on a detection signal from a temperature sensor capable of detecting a temperature on the upstream side of the turbine impeller. Thus, an exhaust temperature on the upstream side of the turbine impeller is not calculated but is obtained based on the detection signal from the temperature sensor. Thereby, the exhaust temperature can be obtained with higher accuracy.

DETAILED DESCRIPTION OF THE INVENTION

Each of the additional features and teachings disclosed above and below may be utilized separately or in conjunction with other features and teachings to provide improved control methods and control apparatuses of internal-combustion engines. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
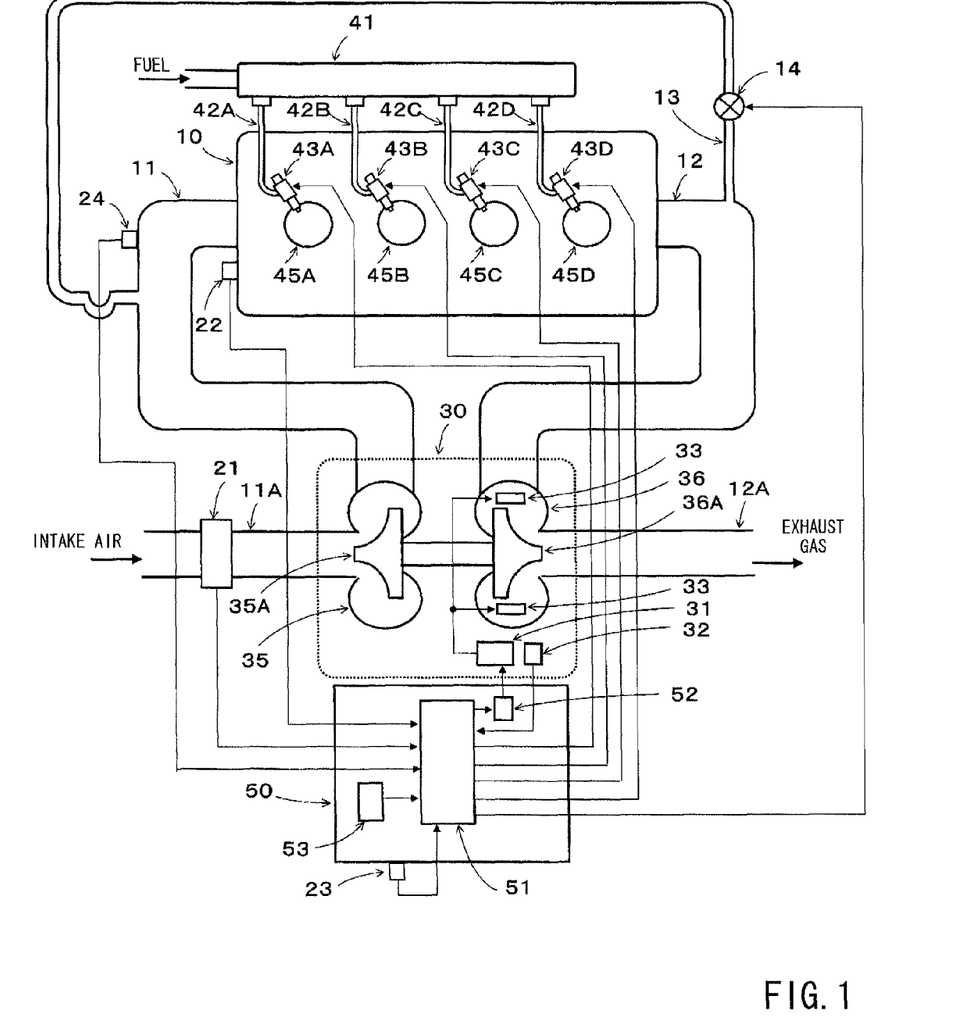
FIG. 1 is a schematic view of an internal-combustion engine capable of being applied to a control method of the present invention.

An embodiment of the invention will be described with reference to drawings. FIG. 1 shows an engine 10 (for example, a diesel engine) as an internal-combustion engine. The engine 10 is connected to an intake pipe 11 and an exhaust pipe 12. The intake pipe 11 introduces intake air to respective cylinders 45A to 45D of the engine 10. The exhaust pipe 12 ejects exhaust gas from the respective cylinders 45A to 45D. The intake pipe 11 is provided with a supercharging pressure detection means (pressure sensor) 24. A control means (controller) 51 may detect a supercharging pressure of intake air on the basis of a detection signal from the supercharging pressure detection means 24. The engine 10 is provided with a revolution detection means (revolution detection sensor) 22. The revolution detection means 22 can detect the number of revolutions (for example, the number of revolutions of a crank shaft) of the internal-combustion engine, a revolution angle (a compression top dead center timing of each cylinder), and the like. The control means 51 can gain or detect the number of revolutions, a revolution angle, and the like of the engine 10 based on a detection signal from the revolution detection means 22.

Fuel is supplied to a common rail 41 from a fuel tank (not shown). The fuel in the common rail 41 is maintained at high pressure and is supplied to respective injectors 43A to 43D through fuel pipes 42A to 42D. The injectors 43A to 43D correspond to the respective cylinders 45A to 45D, and inject a predetermined amount of the fuel into the respective cylinders at predetermined timings in response to a control signal from the control means 51. The control means 51 receives detection signals from a variety of detection means, detects an operation state of the engine 10, and outputs a control signal for driving the injectors 43A to 43D. The control means 51 may detect a fuel flow rate supplied to the respective cylinders 45A to 45D based on the control signal (injection command signal) which has been output to the injectors 43A to 43D.

A turbo supercharger 30 includes a compressor 35 having a compressor impeller 35A and a turbine 36 having a turbine impeller 36A. The turbine 36 is provided with variable nozzles 33 which can adjust the flow velocity of gas exhausted to the turbine impeller 36A. An opening degree of the variable nozzles 33 is adjusted by a driving means (driving unit) 31. The control means 51 may output a control signal to the driving means 31 through an opening degree adjustment means (opening degree adjustment device) 52 so as to adjust an opening degree of the variable nozzles 33. The control means 51 may detect an opening degree of the variable nozzles 33 on the basis of a detection signal from an opening degree detection means (sensor) 32.

The compressor 35 is connected to an intake path 11A and the intake pipe 11. The compressor 35 receives intake air from the intake path 11A. The compressor impeller 35A compresses the intake air, and the compressed intake air is ejected to the intake pipe 11. Thereby, the compressor 35 supercharges the engine 10. The intake path 11A is provided with a flow rate detection means (sensor) 21 which can detect a flow rate of intake air. The control means 51 may gain or detect a flow rate of the intake air received by the internal-combustion engine 10 on the basis of a detection signal from the flow rate detection means 21. The turbine 36 is connected to an exhaust path 12A and the exhaust pipe 12. High temperature and high pressure of the exhaust gas from the exhaust pipe 12 are introduced into the turbine 36 so as to rotate the turbine impeller 36A (and the compressor impeller 35A) and are ejected to the exhaust path 12A.

The exhaust pipe 12 communicates with the intake pipe 11 through an EGR path 13. An EGR valve 14 is disposed in the EGR path. The control means 51 controls the EGR valve 14. In this way, the exhaust gas in the exhaust pipe 12 may return to the intake pipe 11. The control means 51 is provided with an atmospheric pressure detection means (pressure sensor) 23. The control means 51 may gain or detect atmospheric pressure on the basis of a detection signal from the atmospheric pressure detection means 23. A control apparatus 50 includes the control means (controller) 51, the opening degree adjustment means 52, and a storage means (memory) 53.

When the internal-combustion engine is operated at a very high load and high revolution states, a big pressure difference occurs before and after the turbine impeller 36A. Exhaust pulsation occurs due to each explosion stroke of the internal-combustion engine. A stress occurs before and after the turbine impeller 36A due to the pressure difference and exhaust pulsation. If the turbine impeller 36A is continuously exposed to a stress which is equal to or greater than a predetermined stress for a long time, the life thereof may be shortened. In order to prevent this, an opening degree of the variable nozzles 33 is controlled using a control block diagram shown in FIG. 2 and through a flowchart process shown in FIG. 3. Thereby, a before-after pressure ratio of the turbine impeller 36A (pressure before turbine/pressure after turbine) is equal to or less than a predetermined pressure ratio.

Figure 2:
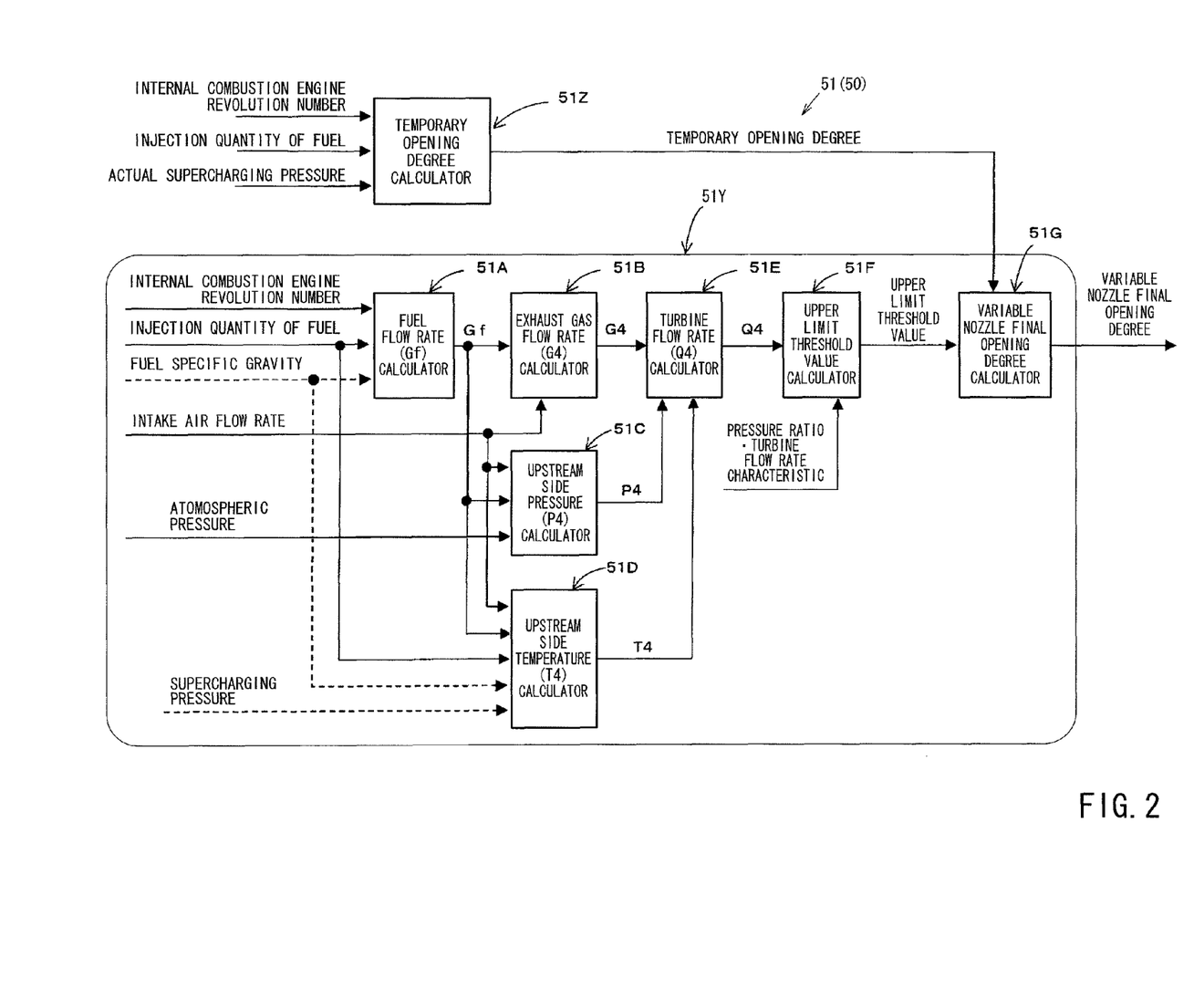
FIG. 2 is a block diagram for explanation of the control method.

As shown in FIG. 2, the control apparatus 50 of the internal-combustion engine includes a control block 51Z and a control block 51Y. The control block 51Z is an existing control block for calculating a temporary opening degree of the variable nozzles 33. The control apparatus 50 sets an upper limit threshold value of an opening degree of the variable nozzles 33 by using the control block 51Y in addition to the control block 51Z. The control apparatus 50 appropriately controls an opening degree of the variable nozzles 33 such that a before-after pressure ratio of the turbine impeller 36A (pressure before turbine/pressure after turbine) is equal to or less than a predetermined pressure ratio.

Figure 3:
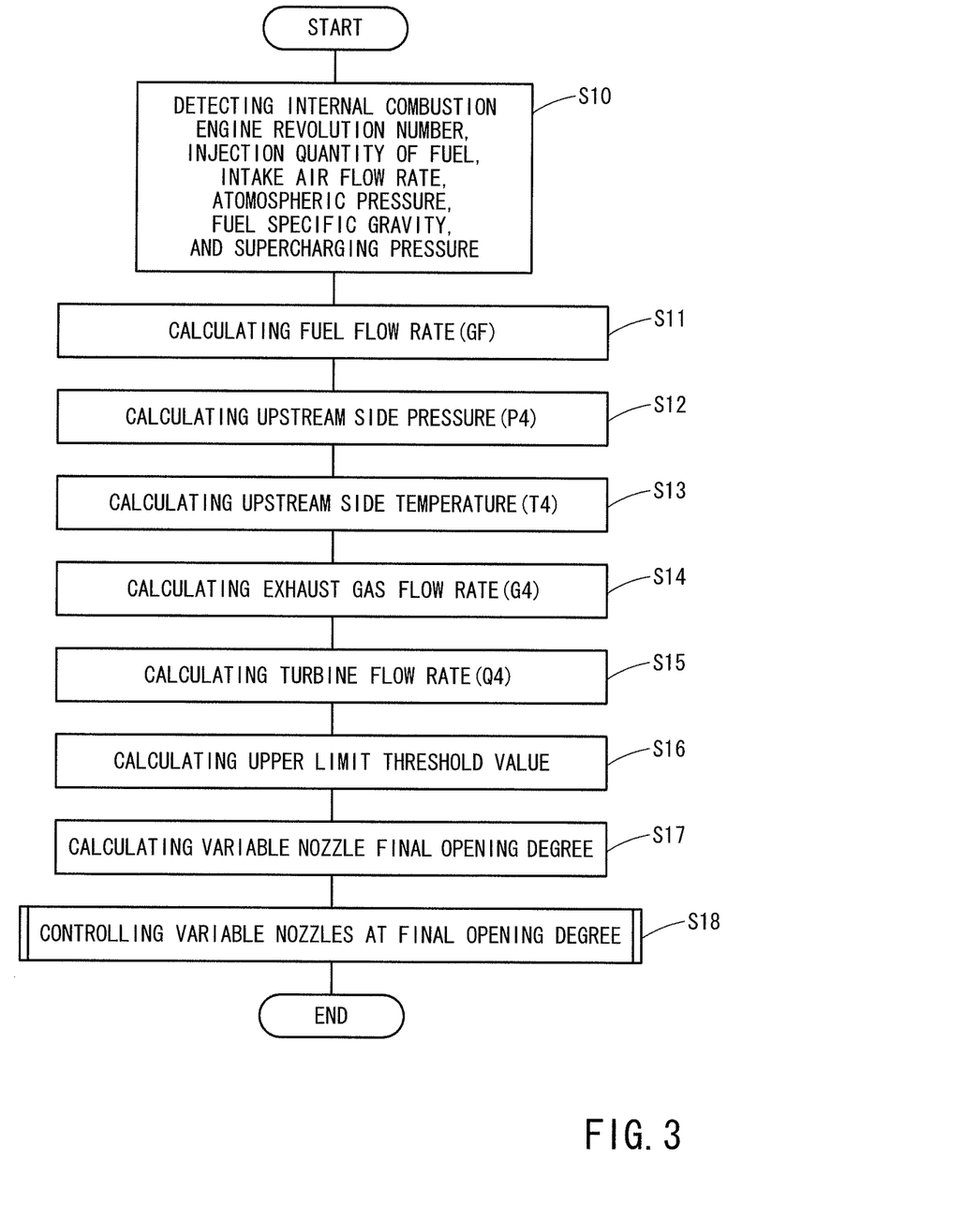
FIG. 3 is a flow chart for a procedure of the block diagram of FIG. 2.

The flowchart process shown in FIG. 3 is executed at a predetermined timing (for example, a predetermined time interval of several ms to several tens of ms, or the like). In step S10, the control means 51 detects an internal-combustion engine revolution number on the basis of a detection signal from the revolution detection means (device) 22. The control means 51 detects an injection quantity of fuel into the internal-combustion engine on the basis of a control signal (injection command signal) sent to the injectors 43A to 43D. The control means 51 detects a flow rate of intake air received by the internal-combustion engine on the basis of a detection signal from the flow rate detection means 21. The control means 51 detects atmospheric pressure on the basis of a detection signal from the atmospheric pressure detection means 23. The control means 51 detects the fuel specific gravity or reads a value of the preset fuel specific gravity on the basis of a detection signal from a specific gravity detection means. The control means 51 detects a supercharging pressure on the basis of a detection signal from the supercharging pressure detection means 24. The process proceeds to step S11 from step S10.

The fuel specific gravity generally does not vary depending on the operational state of the internal-combustion engine but instead has an approximately constant value. For this reason, the fuel specific gravity may be treated as a predetermined fuel specific gravity coefficient. In a case where the fuel specific gravity is treated not as a variable but rather as a predetermined fuel specific gravity coefficient, it is not necessary to input the fuel specific gravity to a control block requiring the fuel specific gravity as a variable. Therefore, a predetermined fuel specific gravity coefficient corresponding to the fuel specific gravity may be set in advance in the control block requiring the fuel specific gravity. Thereby, inputting of the fuel specific gravity may be omitted.

In step S11 (fuel flow rate calculation step), a process of a control block 51A of FIG. 2 is performed. The control means 51 calculates a fuel flow rate Gf[g/s] which is a fuel amount per unit time on the basis of the internal-combustion engine revolution number, the injection quantity, and the fuel specific gravity (the fuel specific gravity may be omitted). The process proceeds to step S12 from step S11.

In step S12 (upstream side pressure calculation step), a process of a control block 51C of FIG. 2 is performed. The control means 51 calculates an upstream side pressure P4[kPa] which is a pressure on the upstream side of the turbine impeller 36A on the basis of the intake air flow rate, the fuel flow rate Gf, and the atmospheric pressure. The process proceeds to step S13 from step S12.

In step S13 (upstream side temperature calculation step), a process involving a control block 51D of FIG. 2 is performed. The control means 51 calculates an upstream side temperature T4[° C.] which is a temperature on the upstream side of the turbine impeller 36A on the basis of the intake air flow rate, the fuel flow rate Gf, the injection quantity, the fuel specific gravity (which may be omitted), and the supercharging pressure (which may be omitted). The process proceeds to step S14 from step S13.

In step S14 (exhaust gas flow rate calculation step), a process involving a control block 51B of FIG. 2 is performed. The control means 51 calculates an exhaust gas flow rate G4[cm$^2$/s] per unit time based on the fuel flow rate Gf and the intake air flow rate. The process proceeds to step S15 from step S14.

In step S15 (turbine flow rate calculation step), a process involving a control block 51E of FIG. 2 is performed. The control means 51 calculates a turbine flow rate Q4[cm$^2$/s] based on the exhaust gas flow rate G4, the upstream side pressure P4, and the upstream side temperature T4. The turbine flow rate Q4 is a flow rate of gas flowing through the turbine 36 or a flow rate of gas flowing through the turbine impeller 36A. The process proceeds to step S16 from step S15.

In step S16 (upper limit threshold value calculation step), a process involving a control block 51F of FIG. 2 is performed. The control means 51 calculates an upper limit threshold value of an opening degree level of the variable nozzles 33 based on the turbine flow rate Q4, and a pressure ratio•turbine flow rate characteristic stored in the storage means 53. The process proceeds to step S17 from step S16.

Figure 4:
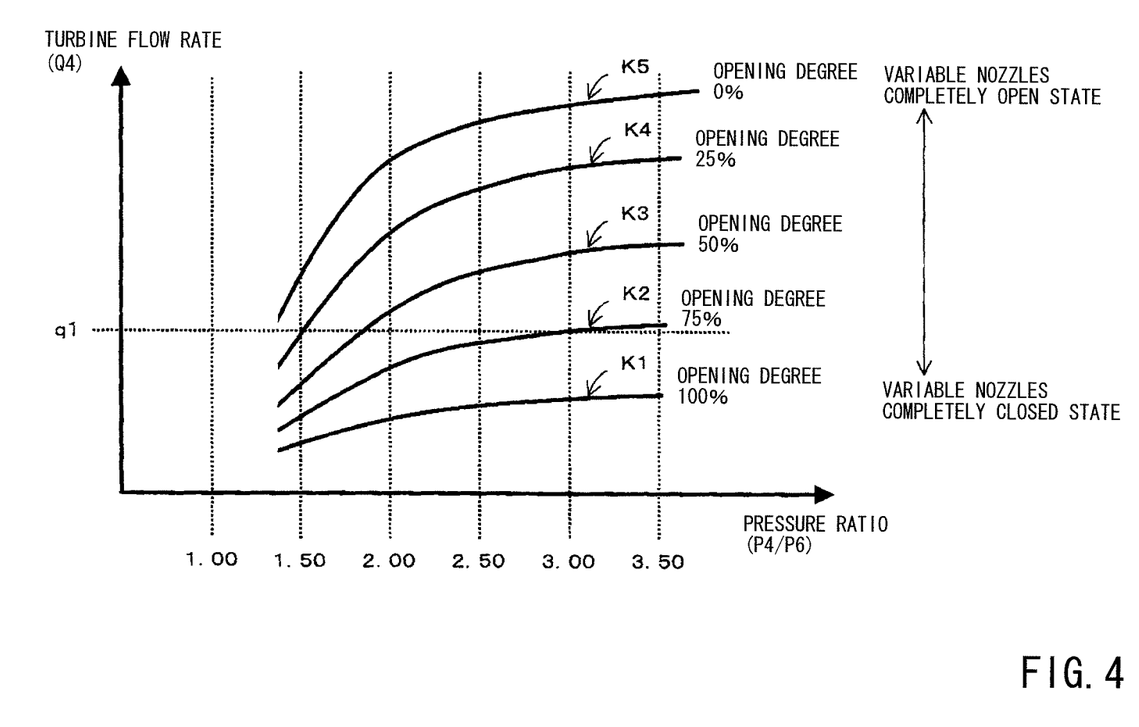
FIG. 4 is a graph of exemplary relationships between pressure rates and turbine flow volumes.

FIG. 4 shows an example of the pressure ratio•turbine flow rate characteristic. The storage means 53 stores the pressure ratio•turbine flow rate characteristic in advance. The horizontal axis of the graph shown in FIG. 4 expresses a pressure ratio (turbine impeller upstream side pressure (P4)/turbine impeller downstream side pressure (P6)). The vertical axis thereof expresses a turbine flow rate (Q4). The graphs K1 to K5 respectively indicate characteristics in a case where an opening degree of the variable nozzles 33 is 100% (completely closed state), 75%, 50%, 25%, and 0% (completely open state).

A description will be made of a case where a pressure ratio is controlled to 3.00 or less using the pressure ratio•turbine flow rate characteristic of FIG. 4. In a case where the turbine flow rate calculated in step S15 is q1, an opening degree of the variable nozzles 33 is made to be 75% or less. Thereby, a pressure ratio is equal to or less than 3.00. Therefore, when a desired pressure ratio is equal to or less than 3.00 and a turbine flow rate is q1, an upper limit threshold value is calculated as 75%.

In step S17 (variable nozzle final opening degree calculation step), a process involving a control block 51G of FIG. 2 is performed. The control means 51 compares the temporary opening degree of the variable nozzles 33 calculated in the step corresponding to the existing control block 51Z with the upper limit threshold value calculated in step S16. The control means 51 selects the smaller of the temporary opening degree and the upper limit threshold value as a final opening degree. The process proceeds to step S18 from step S17.

In step S18 (variable nozzle controlling step), the control means 51 outputs a control signal to the driving means 31 via the opening degree adjustment means 52. The control means 51 controls an opening degree of the variable nozzles 33 so as to be set to the final opening degree. The final opening degree is selected to be equal to or less than the upper limit threshold value.

As described above, the upstream side pressure P4 is calculated in step S12. Alternatively, a pressure detection means (pressure sensor) for detecting a pressure on the upstream side of the turbine impeller 36A may be provided. The upstream side pressure P4 may be directly obtained based on a detection signal from the pressure detection means.

As described above, the upstream side temperature T4 is calculated in step S13. Alternatively, a temperature detection means (temperature sensor) for detecting a temperature on the upstream side of the turbine impeller 36A is provided. The upstream side temperature T4 may be directly obtained based on a detection signal from the temperature detection means.

As described above, the turbine flow rate Q4 is calculated in step S15. Alternatively, a flow rate detection means for detecting the turbine flow rate Q4 is provided. The turbine flow rate Q4 may be directly obtained based on a detection signal from the flow rate detection means.

Figure 5A:
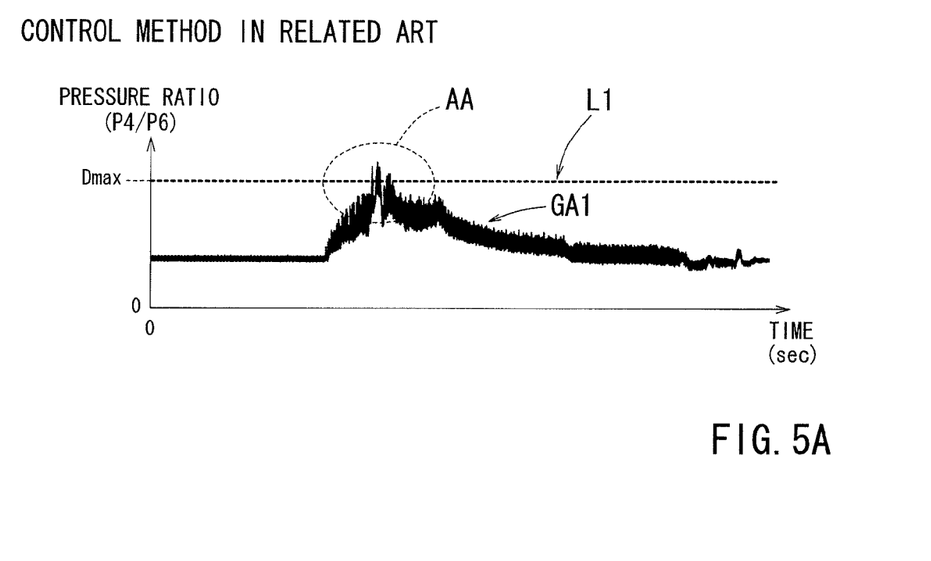
FIG. 5A is a graph of experimental pressure rates in a control method of the related art.
Figure 5B:
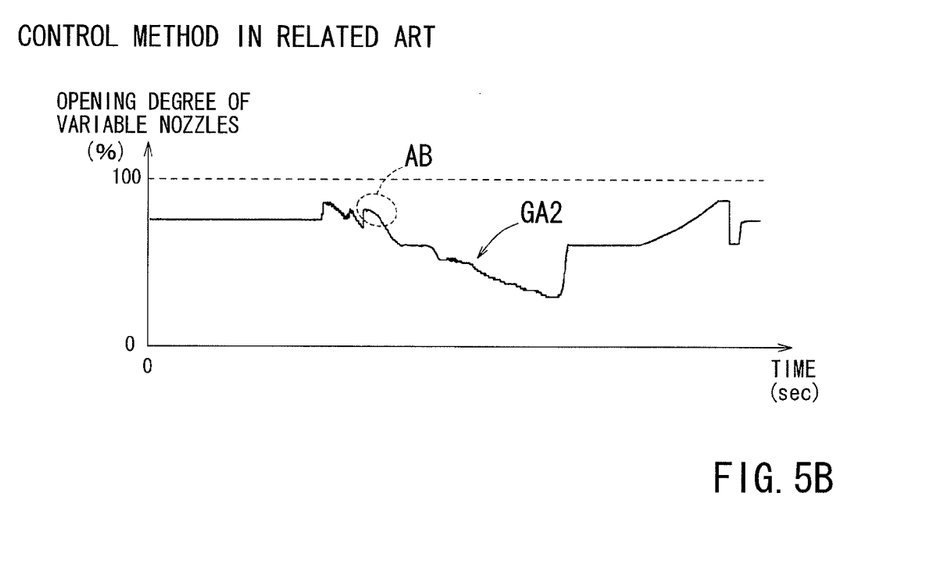
FIG. 5B is a graph of experimental opening rates of variable nozzles in the control method of the related art.

FIGS. 5A to 5D and 6A to 6C show examples of the effects according to the control method of the internal-combustion engine. FIGS. 5A and 5B show effects when the internal-combustion engine is operated in a predetermined operation mode according to a control method in the related art. A graph GA1 of FIG. 5A indicates a variation in a pressure ratio (P4/P6=turbine upstream side pressure/turbine downstream side pressure) relative to time. A graph GA2 of FIG. 5B indicates a variation in an opening degree of the variable nozzles relative to time.

Figure 5C:
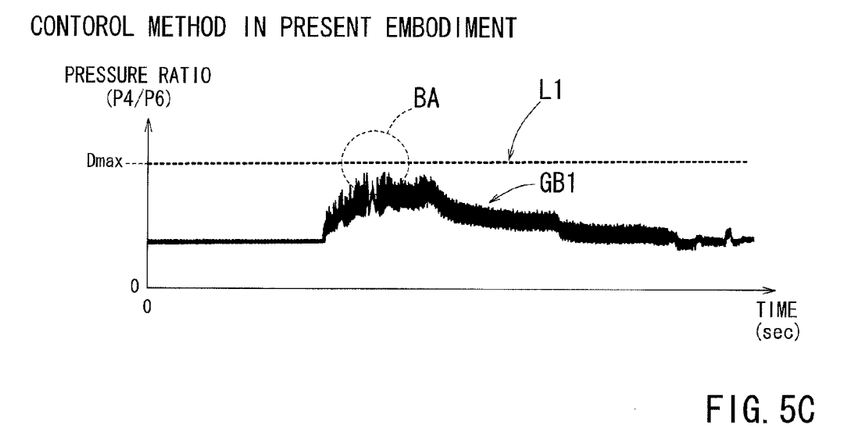
FIG. 5C is a graph of experimental pressure rates in the control method of the present embodiment.
Figure 5D:
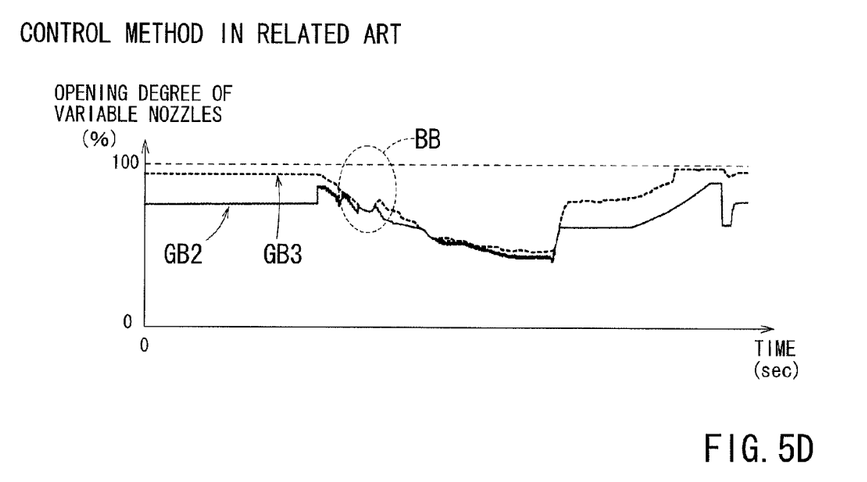
FIG. 5D is a graph of experimental opening rates of variable nozzles in the control method of the present embodiment.

FIGS. 5C and 5D show the effects when the internal-combustion engine is operated in the same operation mode according to the control method in the present embodiment. A graph GB1 of FIG. 5C indicates a variation in a pressure ratio (P4/P6=turbine upstream side pressure/turbine downstream side pressure) relative to time. A graph GB2 of FIG. 5D indicates a variation in an opening degree of the variable nozzles relative to time. In the tests of FIGS. 5A and 5C, the pressure ratio (P4/P6) is set to Dmax or less (the straight line L1 or less). In FIGS. 5B and 5D, a value of 100% in the vertical axis expressing an opening degree of the variable nozzles indicates a completely closed state. A value of 0% indicates a completely open state.

In the control method in the related art, response speed is low as shown in graph GA1 of FIG. 5A. For this reason, the pressure ratio (P4/P6) exceeds Dmax in the region AA. The time when the pressure ratio (P4/P6) exceeds Dmax is a short time. The time is too short to cause instantaneous breaking. However, the life of the turbine impeller is related to an integrated value of time of exceeding Dmax from the viewpoint of fatigue breaking. For this reason, it is not preferable to exceed Dmax in order to secure the turbine impeller for a long time. If an opening degree of the variable nozzles is controlled so as to be further opened in the region AB of the graph GA2 of FIG. 5B, the region AA of the graph GA1 can be suppressed to Dmax or less. However, the response speed is low, and thus control to a desired opening degree is not performed.

In contrast, in the control method in the present embodiment, the pressure ratio (P4/P6) is securely suppressed to Dmax or less in the region BA as shown in the graph GB1 of FIG. 5C. As shown in the graph GB2 of FIG. 5D, an opening degree of the variable nozzles in the region BB is controlled so as to be further opened than an opening degree in the region AB in the graph GA2 of FIG. 5B. The graph GB3 in FIG. 5D indicates the upper limit threshold value of the variable nozzles obtained in step S16 (the control block 51F).

The control method in the present embodiment considerably improves the responsiveness as compared with the control method in the related art. Therefore, in the control method in the present embodiment, an opening degree of the variable nozzles can be controlled to an appropriate opening degree so as to become a desired pressure ratio (P4/P6).

Figure 6A:
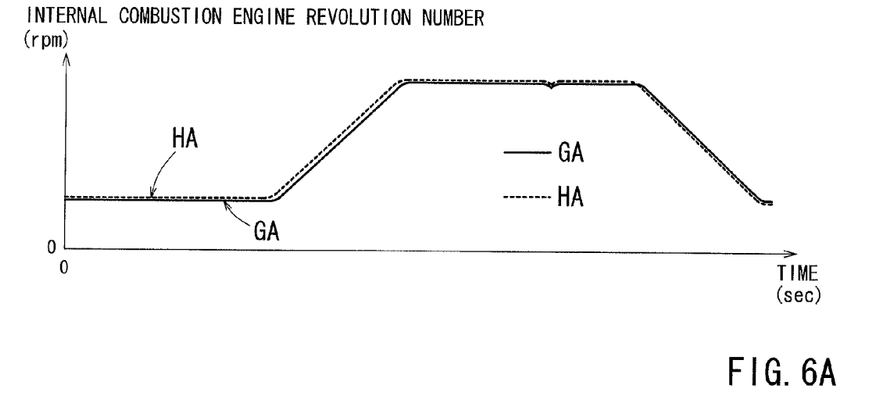
FIG. 6A is a graph of an experimental number of revolutions of the internal-combustion engine in the control methods of present embodiment and related art.
Figure 6B:
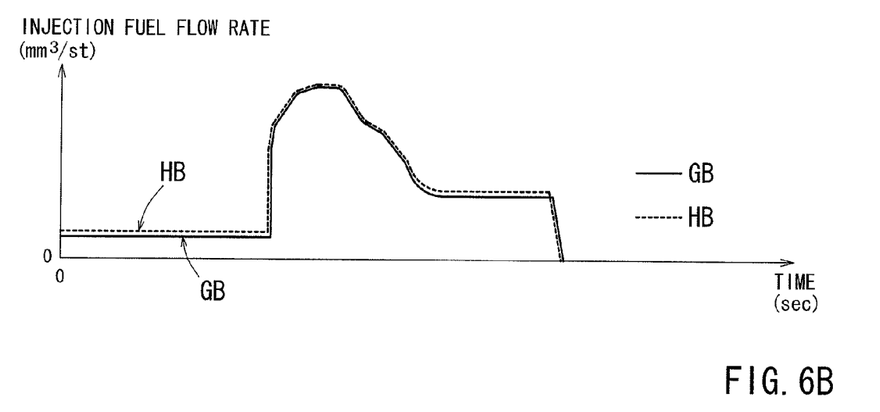
FIG. 6B is a graph of an experimental fuel injection quantity in the control methods of present embodiment and related art.
Figure 6C:
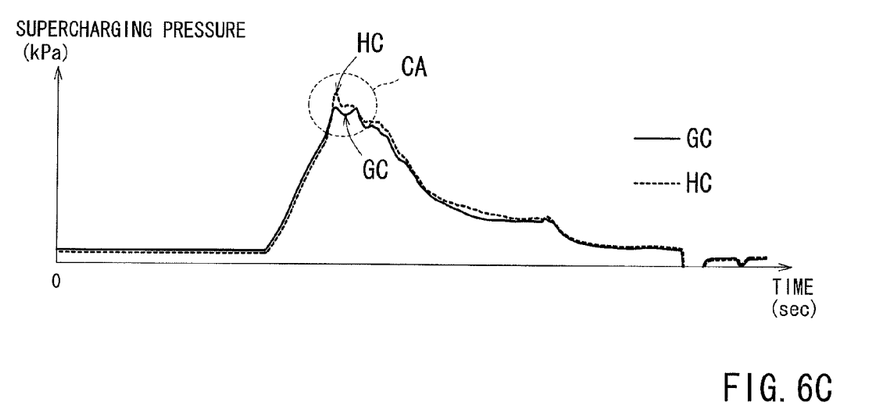
FIG. 6C is a graph of experimental super charging pressure in the control methods of present embodiment and related art.

FIG. 6A shows a variation in the internal-combustion engine revolution number relative to time when the internal-combustion engine is operated in a predetermined operation mode. A graph GA indicates a variation in the number of revolutions in the control method in the present embodiment. A graph HA indicates a variation in the number of revolutions in the control method in the related art. FIG. 6B shows a variation in the injection quantity of fuel into the internal-combustion engine relative to time when the internal-combustion engine is operated in the same operation mode. A graph GB indicates a variation in the injection quantity in the control method in the present embodiment. A graph HB indicates a variation in the injection quantity in the control method in the related art. FIG. 6C shows a variation in the supercharging pressure relative to time when the internal-combustion engine is operated in the same operation mode. A graph GC indicates a variation in the supercharging pressure in the control method in the present embodiment. A graph HC indicates a variation in the supercharging pressure in the control method in the related art.

As shown in FIG. 6A, there is almost no difference between the internal-combustion engine revolution numbers in the present embodiment and the related art. As shown in FIG. 6B, there is almost no difference between the injection quantities in the present embodiment and the related art. Therefore, when the engines are used for a vehicle or the like, it can be seen that traveling performances of the vehicle in the present embodiment and the related art are equivalent to each other.

In the region CA shown in FIG. 6C, the graph HC related to the control method in the related art has a protruding peak. Therefore, overshoot of the supercharging pressure occurs in the graph HC. Recently, the intake pipe 11 has been frequently made of a resin or the like, and an upper limit value of the supercharging pressure is set therein. Therefore, it is necessary to control the overshoot of the supercharging pressure so as not to exceed the upper limit value. In other words, the control method in the present embodiment can further reduce the overshoot of the supercharging pressure while realizing the same traveling performance as in the related art. Thereby, the control method in the present embodiment can improve an appropriate limit, and is a control method more preferable than the control method in the related art.

In the control method of the internal-combustion engine related to the present embodiment, the pressure detection means on the turbine upstream side, the pressure detection means on the turbine downstream side, and the temperature detection means on the turbine upstream side may be omitted. For this reason, it is possible to further reduce the number of detection means and to thereby further reduce costs of the internal-combustion engine.

The control apparatus 50 of the internal-combustion engine for carrying out the above-described control method includes the turbo supercharger as shown in FIG. 1. The turbo supercharger includes the variable nozzles which can control a flow velocity of gas exhausted to the turbine impeller. The control apparatus 50 includes the opening degree adjustment means (opening degree adjustment device) 52, the storage means 53, and the control means (control apparatus) 51. The opening degree adjustment means 52 adjusts an opening degree of the variable nozzles. The storage means 53 stores a pressure ratio•turbine flow rate characteristic (refer to FIG. 4). In the pressure ratio•turbine flow rate characteristic, a turbine flow rate according to a ratio of the pressure on the upstream side of the turbine impeller 36A to the pressure on the downstream side of the turbine impeller 36A is set at each opening degree level of the variable nozzles. The pressure ratio•turbine flow rate characteristics are dependent upon the opening degree level of the variable nozzles.

The control means 51 detects an intake air flow rate, an injection quantity of fuel, an internal-combustion engine revolution number, and atmospheric pressure as shown in step S10 of FIG. 3. The intake air flow rate is a flow rate of intake air which is received by the internal-combustion engine, and is detected based on a detection signal from the flow rate detection means 21 (intake air flow meter). The injection quantity of fuel into the internal-combustion engine is detected based on an injection command signal sent to the injectors. The injectors inject fuel into the internal-combustion engine. The internal-combustion engine revolution number is detected based on a detection signal from the revolution detection means 22 (internal-combustion engine revolution number detection means or device). The atmospheric pressure is detected based on a detection signal from the atmospheric pressure detection means 23.

The control means 51 calculates a fuel flow rate, an upstream side pressure, and an upstream side temperature as shown in FIGS. 2 and 3. The fuel flow rate is a fuel amount supplied to the internal-combustion engine, and is calculated based on the injection quantity and the internal-combustion engine revolution number. The upstream side pressure is a pressure on the upstream side of the turbine impeller, and is calculated based on the intake air flow rate, the fuel flow rate, and the atmospheric pressure. The upstream side temperature is a temperature on the upstream side of the turbine impeller, and is calculated based on the injection quantity, the intake air flow rate, and the fuel flow rate.

The control means 51 calculates a turbine flow rate and an upper limit threshold value. The turbine flow rate is calculated based on the fuel flow rate, the intake air flow rate, the upstream side pressure, and the upstream side temperature. The upper limit threshold value of an opening degree level of the variable nozzles is calculated such that a ratio of the pressure on the upstream side to the pressure on the downstream side of the turbine impeller is equal to or less than a predetermined ratio on the basis of the turbine flow rate and the pressure ratio•turbine flow rate characteristic. The control means 51 adjusts an opening degree of the variable nozzles 33 so as to be equal to or less than the upper limit threshold value by using the opening degree adjustment means 52.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

A target control system to which the control method and the control apparatus of the internal-combustion engine may be the system shown in FIG. 1. Alternatively, the target control system may be other internal-combustion engines including a turbo supercharger with variable nozzles.

The numerical values used for the description of the present embodiment are an example, and the invention is not limited to these numerical values.

This invention claims:

1. A control method of an internal-combustion engine having a turbo supercharger with a variable nozzle capable of adjusting a flow velocity of gas exhausted to a turbine impeller, and an opening degree adjustment device configured to adjust an opening degree of the variable nozzle, the method executed by a control apparatus comprising the steps of:

determining a fuel flow rate according to an injection command signal sent to an injector for injecting fuel in the internal-combustion engine and a number of revolutions of the internal-combustion engine according to a detection signal from an internal-combustion engine revolution number detection device;

determining an upstream side pressure on an upstream side of the turbine impeller;

determining an upstream side temperature on the upstream side of the turbine impeller;

determining a turbine flow rate of gas flowing toward the turbine impeller;

determining an upper limit threshold value of an opening degree level of the variable nozzle such that a turbine pressure ratio is equal to or less than a predetermined ratio according to the turbine flow rate and a pressure ratio•turbine flow rate characteristic, wherein the turbine pressure ratio is a ratio of the upstream side pressure to a downstream side pressure of the turbine impeller, wherein the pressure ratio•turbine flow rate characteristic is pre-stored information indicating a relationship between the turbine pressure ratio, the turbine flow rate, and the opening degree level of the variable nozzle;

controlling an opening degree of the variable nozzle to be the opening degree level equal to or less than the upper limit threshold value, wherein the control apparatus determines the upstream side pressure according to an intake air flow rate received in the internal-combustion engine, the fuel flow rate, and an atmospheric pressure, wherein the control apparatus determines the upstream side temperature according to an injection quantity, the intake air flow rate, and the fuel flow rate and wherein the control apparatus determines the turbine flow rate according to the fuel flow rate, the intake air flow rate, the upstream side pressure, and the upstream side temperature.

2. A control apparatus of an internal-combustion engine comprising:

a turbo supercharger having a variable nozzle capable of adjusting a flow velocity of gas exhausted to a turbine impeller;

a controller configured to adjust an opening degree of the variable nozzle;

a memory configured to store a pressure ratio•turbine flow rate characteristic indicating a relationship between a turbine pressure ratio, a turbine flow rate, and an opening degree level of the variable nozzle, wherein the turbine pressure ratio is a ratio of a pressure on an upstream side of the turbine impeller to a pressure on a downstream side of the turbine impeller; and the controller configured to detect an intake air flow rate received in the internal-combustion engine based on a detection signal from an air flow rate detecting sensor, the controller configured to detect an injection quantity of fuel into the internal-combustion engine according to an injection command signal sent to an injector for injecting the fuel into the internal-combustion engine, the controller configured to detect a number of revolutions of the internal-combustion engine according to a detection signal from an internal-combustion engine revolution number detection device, the controller configured to detect an atmospheric pressure based on a detection signal from an atmospheric pressure sensor, the controller configured to determine a fuel flow rate according to the injection quantity and the internal-combustion engine revolution number, the controller configured to determine an upstream side pressure on the upstream side of the turbine impeller, the controller configured to determine an upstream side temperature on the upstream side of the turbine impeller, the controller configured to determine the turbine flow rate, the controller configured to determine an upper limit threshold value of the opening degree level of the variable nozzle such that the turbine pressure ratio is equal to or less than a predetermined value according to the turbine flow rate and the pressure ratio•turbine flow rate characteristic, the controller configured to adjust the opening degree of the variable nozzle to be the opening degree level equal to or less than the upper limit threshold value by using the opening degree adjustment device wherein the controller is configured to determine the upstream side pressure according to the intake air flow rate, the fuel flow rate, and the atmospheric pressure, wherein the controller is configured to determine the upstream side temperature according to the injection quantity, the intake air flow rate, and the fuel flow rate, and wherein the controller is configured to determine the turbine flow rate according to the fuel flow rate, the intake air flow rate, the upstream side pressure, and the upstream side temperature.

* * * * *